United States Patent
Kou et al.

(10) Patent No.: US 8,401,586 B2
(45) Date of Patent: Mar. 19, 2013

(54) SYSTEM AND METHOD FOR POWER CONTROL IN DISTRIBUTED NETWORKS

(75) Inventors: Yajun Kou, San Diego, CA (US); Quanzhong Gao, San Diego, CA (US); Pramod Viswanath, Champaign, IL (US)

(73) Assignee: FutureWei Technologies, Inc., Plano, TX (US)

(*) Notice: Subject to any disclaimer, the term of this patent is extended or adjusted under 35 U.S.C. 154(b) by 514 days.

(21) Appl. No.: 12/701,200

(22) Filed: Feb. 5, 2010

(65) Prior Publication Data

US 2011/0195740 A1 Aug. 11, 2011

(51) Int. Cl.
*H04W 52/04* (2009.01)
(52) U.S. Cl. .............. 455/522; 455/41.2; 455/67.13; 455/69
(58) Field of Classification Search .......... 455/522, 455/69, 13.4, 41.2, 41.3, 63.1, 67.13, 70, 455/126, 127.1, 426.1, 446, 459; 370/318, 370/320, 332
See application file for complete search history.

(56) References Cited

U.S. PATENT DOCUMENTS

| | | | |
|---|---|---|---|
| 6,907,260 B1* | 6/2005 | Tsunehara et al. | 455/522 |
| 2009/0082057 A1* | 3/2009 | Hwang et al. | 455/522 |
| 2009/0180448 A1 | 7/2009 | Kobayashi | |

FOREIGN PATENT DOCUMENTS

| | | |
|---|---|---|
| CN | 1323470 A | 11/2001 |
| CN | 101356771 A | 1/2009 |
| CN | 101394207 A | 3/2009 |

OTHER PUBLICATIONS

International Search Report, Applicant: Huawei Technologies Co., LTD., May 26, 2011, 12 pages.

* cited by examiner

*Primary Examiner* — John J Lee
(74) *Attorney, Agent, or Firm* — Slater & Matsil, L.L.P.

(57) ABSTRACT

A system and method for power control in distributed networks is provided. A method for transmitting information includes setting a transmit power level for a subset of communications controllers in a communications network, and transmitting information to a communications device served by a communications controller. The subset of communications controllers includes ad hoc communications controllers in the communications network, and the setting of the transmit power level is performed in a distributed manner. The information is transmitted at a transmit power level set for the communications controller.

23 Claims, 6 Drawing Sheets

SYSTEM AND METHOD FOR POWER CONTROL IN DISTRIBUTED NETWORKS

TECHNICAL FIELD

The present invention relates generally to wireless communications, and more particularly to a system and method for power control in distributed networks.

BACKGROUND

Generally, in traditional cellular communications systems, base stations (BSs) are introduced to the communications system in an organized manner: usually to increase coverage in a rural area or system capacity in an urban area. Typically, when a new BS is introduced to the communications system, the topology of the communications system is changed. This may cause a potential problem for system operators. For example, in second generation (2G) technologies like GSM, system engineers may need to manually reassign frequency reuse patterns for the new network topology.

An advantage of CDMA and other universal frequency reuse communications systems is that there is no need to redesign the frequency reuse pattern. Nevertheless, a transmit power setting of the new BS and of the surrounding BSs may have to be set and/or reset manually. A classical rule for setting transmit power is to set the transmit power of BSs so that at a cell boundary, the received transmit power from neighboring BSs are approximately equal. Additionally, the received transmit power should be more, but not too much more than a background noise level. In general, if the transmit power of a BS is too high, then a signal plus interference to noise ratio (SINR) of a user located at a cell boundary may be interference limited and the excessive transmit power is wasted, while if the transmit power is too low, the coverage of the BS is not very good. Additionally, there may be motivation for a cell boundary between two BSs to be approximately in between the two BSs since this may allow for equally large cells and may lead to a robust and scalable network topology.

SUMMARY OF THE INVENTION

These and other problems are generally solved or circumvented, and technical advantages are generally achieved, by embodiments of a system and method for power control in distributed networks.

In accordance with an embodiment, a method for transmitting information is provided. The method includes setting a transmit power level for a subset of communications controllers in a communications network, and transmitting information to a communications device served by a communications controller. The subset of communications controllers includes ad hoc communications controllers in the communications network, and the setting is performed in a distributed manner. The information is transmitted at a transmit power level set for the communications controller.

In accordance with another embodiment, a method for transmitting information is provided. The method includes determining if a communications controller is compatible with a communications network; the communications network includes a plurality of communications controllers. The method also includes if the communications controller is compatible with the communications network, joining the communications network, setting a transmit power level for a subset of communications controllers in the communications network, and transmitting information to a communications device served by the communications controller at a transmit power level set for the communications controller. The method further includes if the communications controller is incompatible with the communications network, changing a network operating parameter of the communications controller, and repeating the determining if a communications controller is compatible with a communications network, the if the communications controller is compatible, and the if the communications controller is incompatible.

In accordance with another embodiment, a communications controller is provided. The communications controller includes a switch mode unit, a received power measure unit coupled to the switch mode unit, a compatibility check unit coupled to the received power measure unit, and a power control unit coupled to the compatibility check unit. The switch mode unit switches an operating mode of the communications controller based on a coordination with other communications controllers, the received power measure unit measures a signal power level received at the communications controller when the communications controller is operating in a receive mode, the compatibility check unit determines a compatibility of the communications controller and a communications network based on the signal power level measurements, and the power control unit sets a transmit power level for the communications controller based on the signal power level measurements.

An advantage of an embodiment is that transmit power control in a distributed network is enabled without the use of a central controller or a significant amount of coordination between distributed network components. Distributed transmit power control may help to improve overall distributed network performance while minimizing an impact on network performance by not requiring a lot of communication to perform coordination or information sharing.

A further advantage of an embodiment is that a base station may check to determine if it is compatible with a network prior to attempting to join the network. Therefore, if the network is not compatible with the base station, resources are not wasted in attempting to join the network. Furthermore, the base station may determine its impact on the network prior to joining and may elect to not join based on the impact on the network, even if the base station is compatible with the network.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a communications network that allows the addition of femto base stations, such as IEEE 802.11 compliant communications networks (WiFi), femto-cell communications networks, and so on. The invention may also be applied, however, to other communications networks that allow the unplanned and uncontrolled addition of base stations (BSs).

Figure 1:
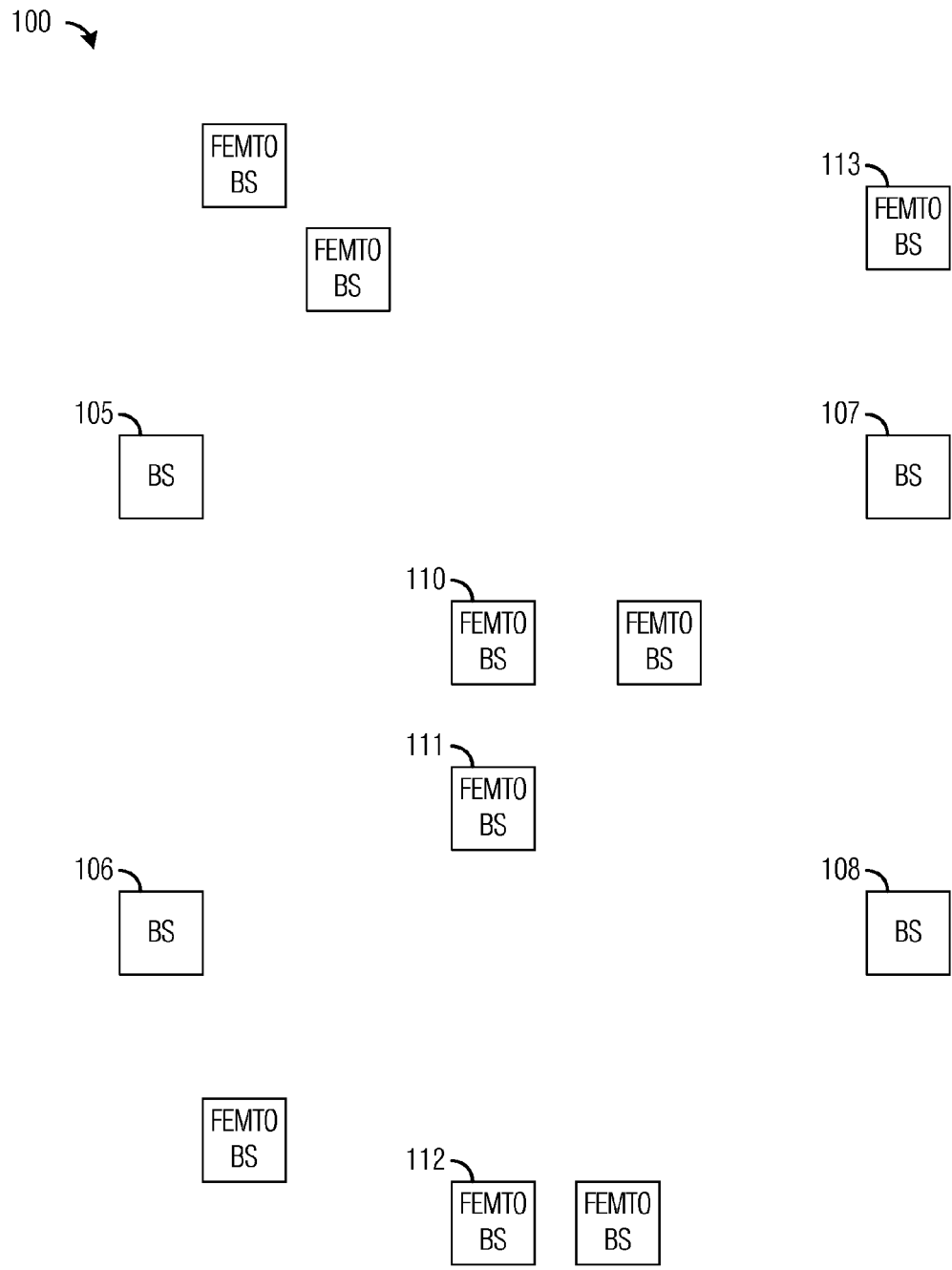
FIG. 1 is a diagram of a communications network that supports femto base stations.

FIG. 1 illustrates a communications network 100 that supports femto BSs. Communications network 100 includes BSs, such as BSs 105 through 108, which may be macro BSs (also known as regular BSs) that are specifically designed and configured to be deployed at a specific location. Communications network 100 may also include femto BSs, such as femto BSs 110 through 113, which may be user installed BSs that are designed to deploy and operate without much consideration given to careful network design criteria. For example, a home owner may install a femto BS to improve the performance of his own mobile stations (MSs), a building owner may install multiple femto BSs throughout his building to improve the performance of MSs of his tenants, or so on.

In a femto-cell communications network or communications networks allowing femto BSs, femto BSs may be designed to reuse the same spectrum as macro BSs, and so there may be no need to redesign frequency reuse patterns. However, femto BSs are generally plug-and-play devices and may be installed by individual users in an ad hoc basis with no clear planning like in a communications network with clear planning. Therefore, careful and centralized reorganization of transmit power settings is not possible.

Furthermore, mismatched connections may lead to irregular cells. Mismatched connections arise from a natural behavior for MSs, also commonly referred to as users, mobile devices, terminals, communications devices, and so forth, to connect to a strongest BS that it detects. However, femto BSs may be proprietary in nature, wherein only certain MSs may be allowed access to a femto BS since a femto BS owner may not wish to share access to his femto BS with neighbors. Therefore, a coverage area of neighboring femto BSs may be different, and the coverage area of femto BSs may overlap with one another.

Therefore, there is a need for a system and method for distributed transmit power control that may adaptively set the transmit power of BSs in a communications network supporting femto BSs. The system and method should be robust to avoid problems such as a ping-pong scenario where the transmit power changes rapidly up and down.

Usually, there are two ways for a new femto BS to connect to an existing communications network, intrusively or non-intrusively. In a non-intrusive connection, the new femto BS may check its compatibility with the existing communications network. If the new femto BS does not meet compatibility requirements, then the new femto BS may need to switch to another frequency band or another communications network altogether so as not to degrade the performance of the communications network. In an intrusive connection, the new femto BS may start transmitting and then make a decision to connect or back out based on responses from BSs (femto and/or regular) in the communications network.

Figure 2:
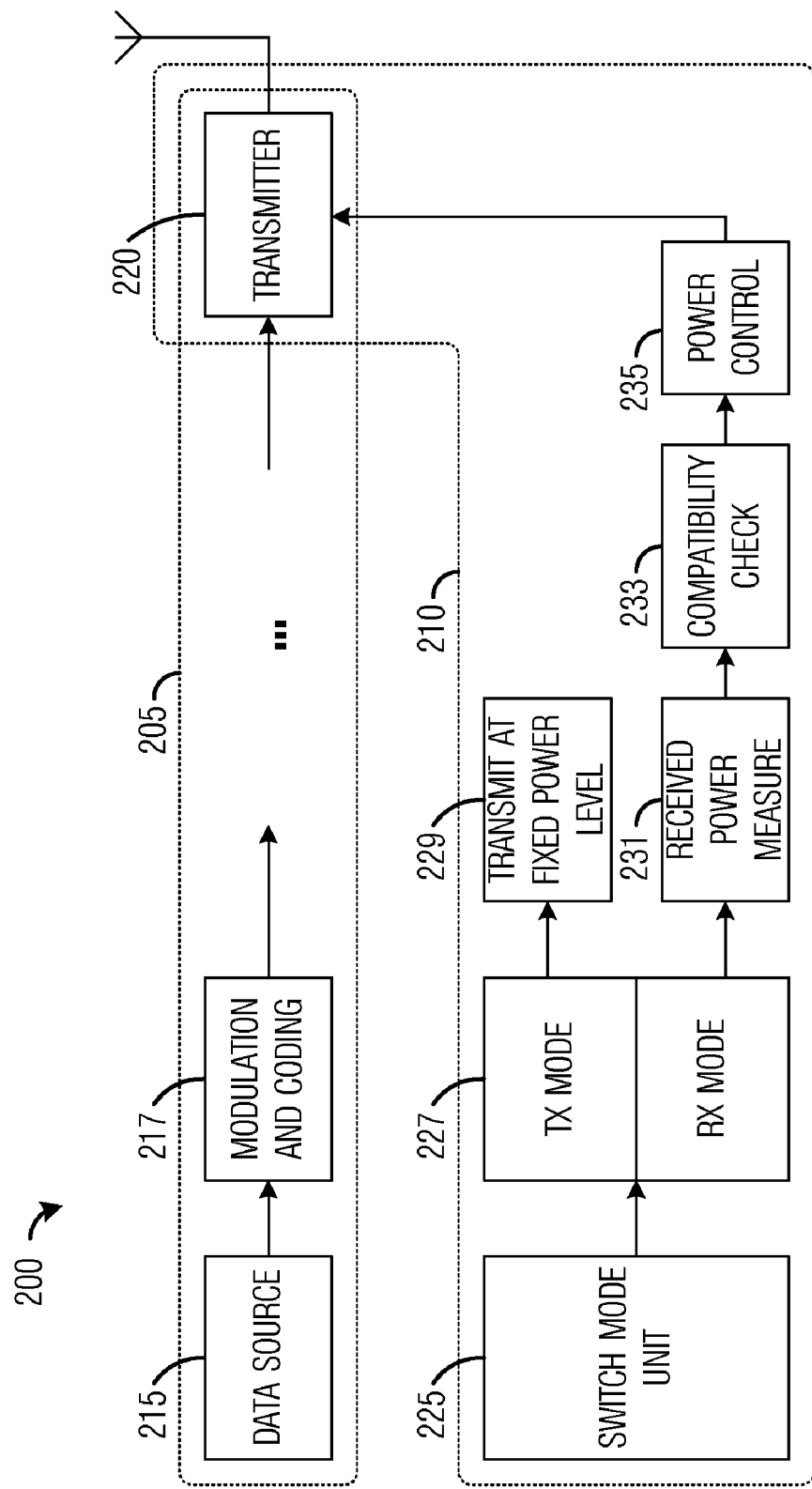
FIG. 2 is a diagram of a BS.

FIG. 2 illustrates a BS 200. BS 200 may be a macro BS or a femto BS and may include hardware and software support for distributed transmit power control. BS 200 includes circuitry for transmitting a data channel (data channel circuitry 205) as well as circuitry for transmitting a control channel (control channel circuitry 210).

Data channel circuitry 205 may include components that are used to transmit information on a data channel, including a data source 215, a modulation and coding unit 217, and a transmitter 220. Data source 215 may include storage, such as memories, buffers, secondary storage, and so forth, that may be used to store data intended for MSs, and so on. Modulation and coding unit 217 may be used to modulate the data intended for MSs onto appropriate carriers for transmission, and encode the data using a selected code. Transmitter 220 may be used to perform signal processing tasks such as encode, interleave, filter, amplify, and so forth, to the data to be transmitted to MSs over one or more transmit antennas.

Control channel circuitry 210 may include components that are used to transmit control information on a data channel. Components of control channel circuitry 210 used in distributed transmit power control are shown in FIG. 2. Control channel circuitry 210 includes a switch mode unit 225 that may be used to switch an operating mode of BS 200 based on an agreed upon protocol. For example, BS 200 may be placed in a transmit mode at certain times to assist other BSs in making measurements to be used in distributed transmit power control. Similarly, BS 200 may be placed in a receive mode at other times to listen to transmissions made by other BSs to make measurements to be used in distributed transmit power control. Operation of switch mode unit 225 may be based on timing information, transmissions, control channel transmissions, occurrence of specified events, and so forth.

Control channel circuitry 210 also includes a transmit (TX) mode/receive (RX) mode unit 227 coupled to switch mode unit 225. TX/RX mode unit 227 may be used to control the operation of BS 200 depending on the operating mode of BS 200. For example, if BS 200 is operating in transmit mode to transmit so that other BSs may make measurements, then BS 200 may transmit at a fixed power level with transmit at fixed power level unit 229. In addition to transmitting at a fixed power level, BS 200 may transmit a known message, such as a reference signal, pilot, or so forth. If BS 200 is operating in receive mode where it receives transmissions from other BSs in order to make measurements, then BS 200 may utilize a receive power measure unit 231 to make measurements of received signal power levels, a compatibility check unit 233 to determine if BS 200 is compatible with a communications network, and a power control unit 235 to make adjustments to the transmit power level of BS 200 based on measurements made by BS 200. Control channel circuitry 210 may share transmitter 220 with data channel circuitry 205 to reduce circuit redundancy and reduce costs and complexity.

Figure 3:
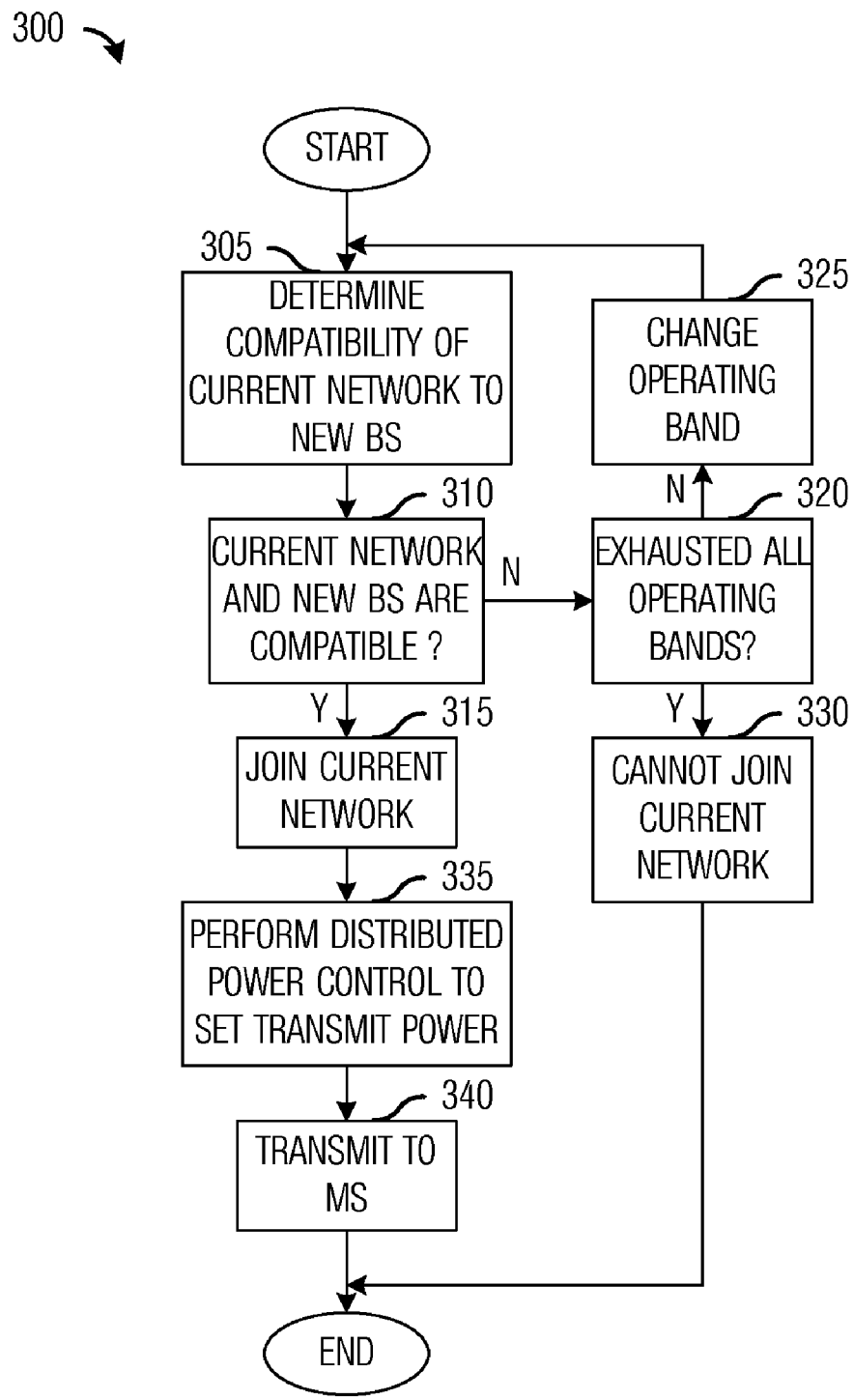
FIG. 3 is a flow diagram of BS operations.

FIG. 3 illustrates a flow diagram of BS operations 300. BS operations 300 may be indicative of operations occurring in a BS, such as a femto BS, as it attempts to join a communications network. BS operations 300 may occur while the BS is in a normal operating mode and after it is powered on, reset, or otherwise comes into an operating area of the communications network.

BS operations 300 may begin with the BS determining its compatibility with the communications network (block 305). Compatibility with the communications network may involve determining information such as an impact of the BS on the communications network, an impact of the communications network on the BS, and so forth. Compatibility may depend on factors such as a number of BSs already in the communications network, available operating bands, operating bands that the BS is capable of using, authorization/subscription level of user operating the BS, and so on. Techniques for determining compatibility are discussed in greater detail below.

After determining its compatibility, the BS may perform a check to determine if the BS and the communications network are compatible (block 310). If the BS and the communications network are compatible, then the BS may join the communications network (block 315). Joining the communications network may entail the exchange of numerous messages and information, configuring network parameters, setting up accounting information, and so forth, and may be beyond the scope of the current discussion.

If the BS and the communications network are incompatible (block 310), then the BS may perform a check to determine if it has exhausted all possible operating bands in its determining of compatibility (block 320). For example, in a particularly busy or heavily used operating band, the BS may negatively impact the communications network and may therefore be incompatible, while in a different operating band, the BS may not negatively impact the communications network and may be compatible. In general, the BS may change a network operating parameter, such as an operating band, a time slot, a spreading code, and so forth, to alter an operating environment of the BS that may be used to separate the different BSs operating in the communications network. If the BS has not exhausted all possible operating bands in its determining of compatibility, then the BS may change operating band (block 325) and repeat determining compatibility (block 305).

However, if the BS has exhausted all possible operating bands, then the BS may not join the communications network (block 330) and BS operations 300 may terminate. According to an embodiment, the BS may attempt to find another communications network or wait a period of time (either specified or randomly determined) before repeating its attempt to join the communications network.

If the BS and the communications network are compatible and the BS successfully joined the communications network (blocks 310 and 315, respectively), then the BS may initiate a distributed transmit power control operation to set its transmit power level (along with the transmit power level of other BSs in the communications network) in order to minimize interference and maximize performance (block 335). Detailed discussions of distributed transmit power control are provided below. With its transmit power level set, the BS may transmit to MSs that it is serving (block 340). BS operations 300 may then terminate.

According to an alternative embodiment, the distributed transmit power control may be automatically initiated when the BS joined the communications network. According to yet another alternative embodiment, instead of the BS initiating the distributed transmit power control or automatically initiating the distributed transmit power control, the distributed transmit power control may be initiated at specified times, at regular intervals, for example. According to yet another alternative embodiment, the initiating of the distributed transmit power control may occur due to the occurrence of an event, such as when a measured SINR reaches a threshold, an error rate reaches a threshold, quality of service restrictions are not met, or so forth.

Consider a communications network with K femto BSs and M macro BSs operating in a neighborhood of interest. A channel attenuation between BSs k and l may be denoted as $h_{kl}$, where k and l are non negative integer values, may be fixed over time. For the purpose of simplicity, $h_{kk}$ is assumed to be equal to one. The transmit power setting of a BS needs to satisfy the following constraint, wherein the constraint depends on the BS, i.e., whether the BS is a macro BS or a femto BS.

Macro BS—The transmit power may be carefully set by an operator of the communications network with the transmit power set primarily on coverage and capacity considerations and attention given to other macro BSs in the neighborhood. Generally, the transmit power of a macro BS may not be altered due to demands set by femto BSs. Therefore, $Q_m$, the transmit power of a macro BS m is fixed.

Femto BS—A main constraint on the transmit power level of a femto BS is that it should be high enough such that it provides a sufficiently high SINR to MSs in its local neighborhood. Since the local neighborhood may be very small, it may be assumed that the SINR measurement is made by the femto BS itself (or such a measurement may be made by a MS based on silence periods, zero pilots, and so on, and fed back to the femto BS). The constraint may be expressed as:

$$\frac{P_k}{N_0 + \sum_{l=1, l \neq k}^{K} P_l h_{kl} + \sum_{m=1}^{M} Q_m h_{km}} \geq \beta_k, \tag{1}$$

where $P_k$ is the transmit power for femto BS k, $\beta_k$ is an objective SINR for a communications channel between femto BS k and a MS served by femto BS k, $Q_m$ the transmit power of a macro BS m, and $N_0$ is noise power.

A question that may be considered is under what conditions on $\beta_k$, $h_{kl}$, and $Q_m$, can the femto BS transmit powers $P_1, \ldots, P_k$ be allocated. Without loss of generality, it may be assumed that $\beta_k = \beta$. Therefore, Inequality (1) may be rewritten as:

$$P_k - \beta \sum_{l=1, l \neq k}^{K} P_l h_{kl} \geq \beta I_k, \tag{2a}$$

where a total noise plus interference seen by femto BS k may be denoted as:

$$I_k = N_0 + \sum_{m=1}^{M} Q_m h_{km}. \tag{2b}$$

Inequality (2a) may be expressed in matrix form as:

$$(I - \beta H) p \geq \beta i. \tag{3}$$

The identity matrix $(I-\beta H)p \geq \beta i$, the channel attenuation matrix H with (k,l)-th element equal to $h_{kl}$ and (k,k)-th element equal to zero, the transmit power vector p, and the vector i with k-th coordinate equal to $I_k$.

The transmit power allocation shown in Inequality (3) may be feasible when a largest eigenvalue of the matrix H (commonly referred to as the Perron Frobenius eigenvalue) is strictly less than $1/\beta$, i.e., $$r(H) < 1/\beta. \quad (4)$$

When Inequality (4) is satisfied, the solution $$p^* = \beta(I - \beta H)^{-1} i \quad (5)$$

is the component-wise minimal transmit power allocation that meets the desired SINR constraints.

Distributed techniques for calculating the largest eigenvalue of a matrix may be utilized to determine if a communications network and a femto BS are compatible.

Figures 4A, 4B:
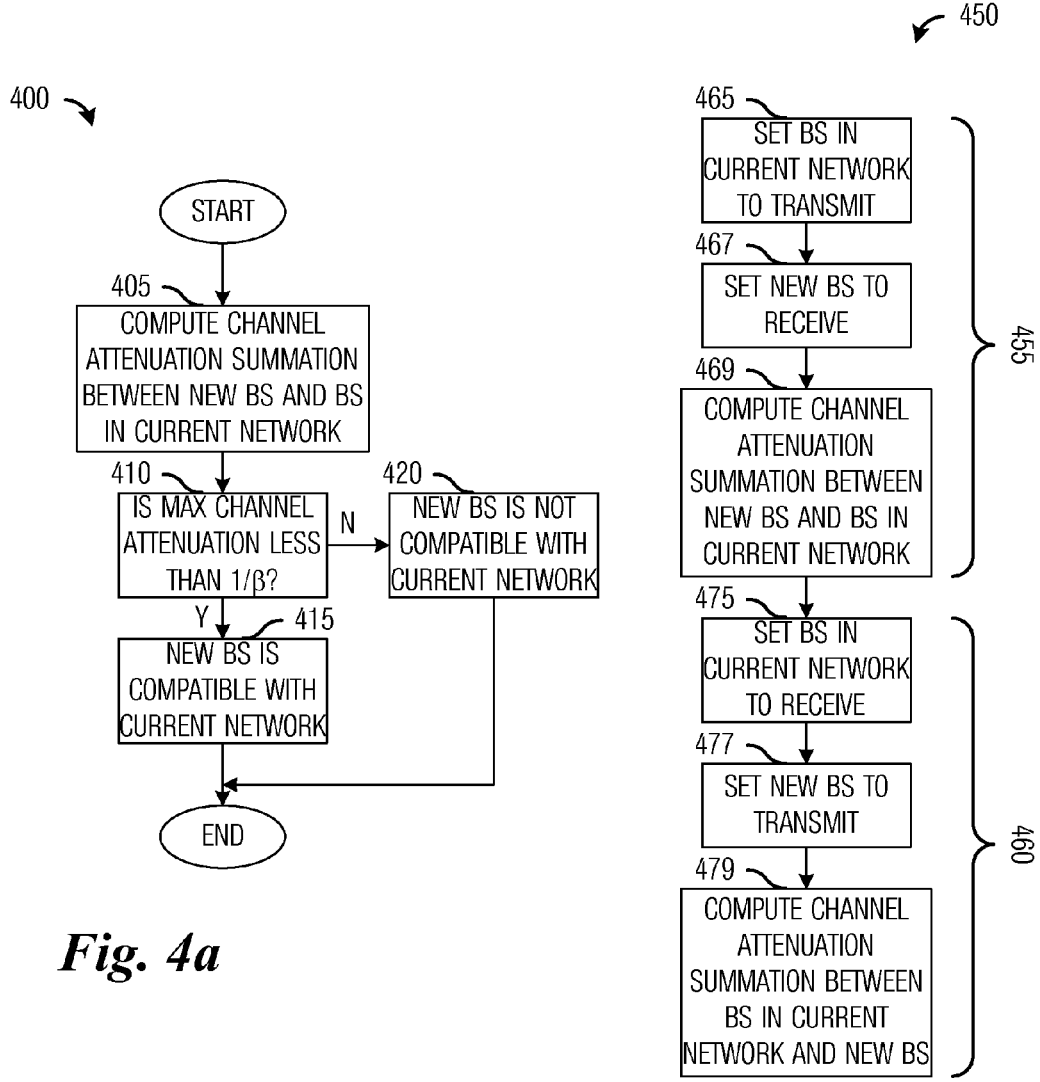
FIG. 4a is a flow diagram of first BS operations in determining compatibility between a BS, such as a femto BS, and a communications network.
FIG. 4b is a flow diagram of BS operations in a multi-phase computation of summations of channel attenuation.

FIG. 4a illustrates a flow diagram of first BS operations 400 in determining compatibility between a BS, such as a femto BS, and a communications network. First BS operations 400 may be indicative of operations occurring in the BS as it determines compatibility with the communications network. First BS operations 400 may occur as the BS attempts to join the communications network. First BS operations 400 may be an implementation of determining its compatibility with the communications network, block 305 of FIG. 3.

An upper bound for r(•) from Inequality (4) may be expressed as:

$$r(H) < \max_{l=1,\ldots,K} \sum_{k=1,\ldots,K} h_{kl}. \quad (6)$$

Therefore, a condition expressible as:

$$\max_{l=1,\ldots,K} \sum_{k=1,\ldots,K} h_{kl} < \frac{1}{\beta} \quad (7)$$

satisfies the compatibility condition in Inequality (4).

First BS operations 400 may begin with the BS participating in a multi-phase computation of summations of channel attenuation between the BS and BSs in the communications network (block 405). The summations of channel attenuation may be as expressed in the left hand side of Inequality (7). A detailed description of the multi-phase computation of summations of channel attenuation between the BS and BSs in the communications network is provided below.

With the summations of channel attenuation between the BS and the BSs in the communications network computed, the BS may compare a maximum summation of channel attenuation with value 1 β (block 410). If the maximum summation of channel attenuation is less than $1/\beta$, then the BS and the communications network are compatible (block 415). However, if the maximum summation of channel attenuation is not less than $1/\beta$, then the BS and the communications network are not compatible (block 420). First BS operations 400 may then terminate.

FIG. 4b illustrates a flow diagram of BS operations 450 in a multi-phase computation of summations of channel attenuation. BS operations 450 may be indicative of operations occurring in a BS, such as a femto BS, attempting to connect to a communications network. BS operations 450 may occur while the BS is attempting to determine a compatibility between the communications network and itself. BS operations 450 may be an implementation of a multi-phase computation of summations of channel attenuation between the BS and BSs in the communications network, block 405 of FIG. 4a.

BS operations 450 may occur in two phases, a first phase 455 where the BS is in a receive mode and a second phase 460 where the BS is in a transmit mode. First phase 455 may allow the BS to make measurements of channel attenuations between the BS and all BSs in the communications network based on transmissions from all BSs in the communications network, while second phase 460 may allow all BSs in the communications network to make measurements of channel attenuations with the BS based on transmissions made by the BS.

First phase 455 includes setting the BSs in the communications network into a transmit mode (block 465) while setting the BS into a receive mode (block 467). Setting of the modes of the BS and the BSs may make use of a TX/RX mode unit, such as TX/RX mode unit 227 of FIG. 2. The BS may then compute a summation of channel attenuation by measuring transmissions made by the BSs in the communications network (block 469). For example, the BS may compute $$\sum_{k=1,\ldots,K} h_{kK},$$

where K is a total number of BSs in the communications network plus the BS. Since the transmit power of the various BSs in the communications network may be different, the measurements should be performed separately and use a fixed-power control channel.

Second phase 460 includes setting the BSs in the communications network to a receive mode (block 475) while setting the BS into a transmit mode (block 477). The BSs in the communications network may then in a distributed manner compute a summation of channel attenuation by measuring transmissions made by the BS (block 479). For example, the BSs in the communications network may compute $$\sum_{k=1,\ldots,K} h_{kl},$$

where K is a total number of BSs in the communications network plus the BS and l is the number of the BS in the communications network making the computation.

Inequality (7) may usually be loose unless all rows have the same sum. This may automatically build in some leeway in the determining of compatibility, which may be desired since finite transmit power values for the BSs may be desired.

Computation/measurement of the summation of channel attenuation (the left hand side of Inequality (7)) may be readily performed in a distributed manner. When the BSs in the communications network are transmitting, the summation computed by the BS may be performed by the BS measuring in first phase 455 the propagation loss to the BSs in the communications network and the BSs in the communications network may update their summations by measuring in second phase 460 their respective propagation loss to the BS.

Figure 5:
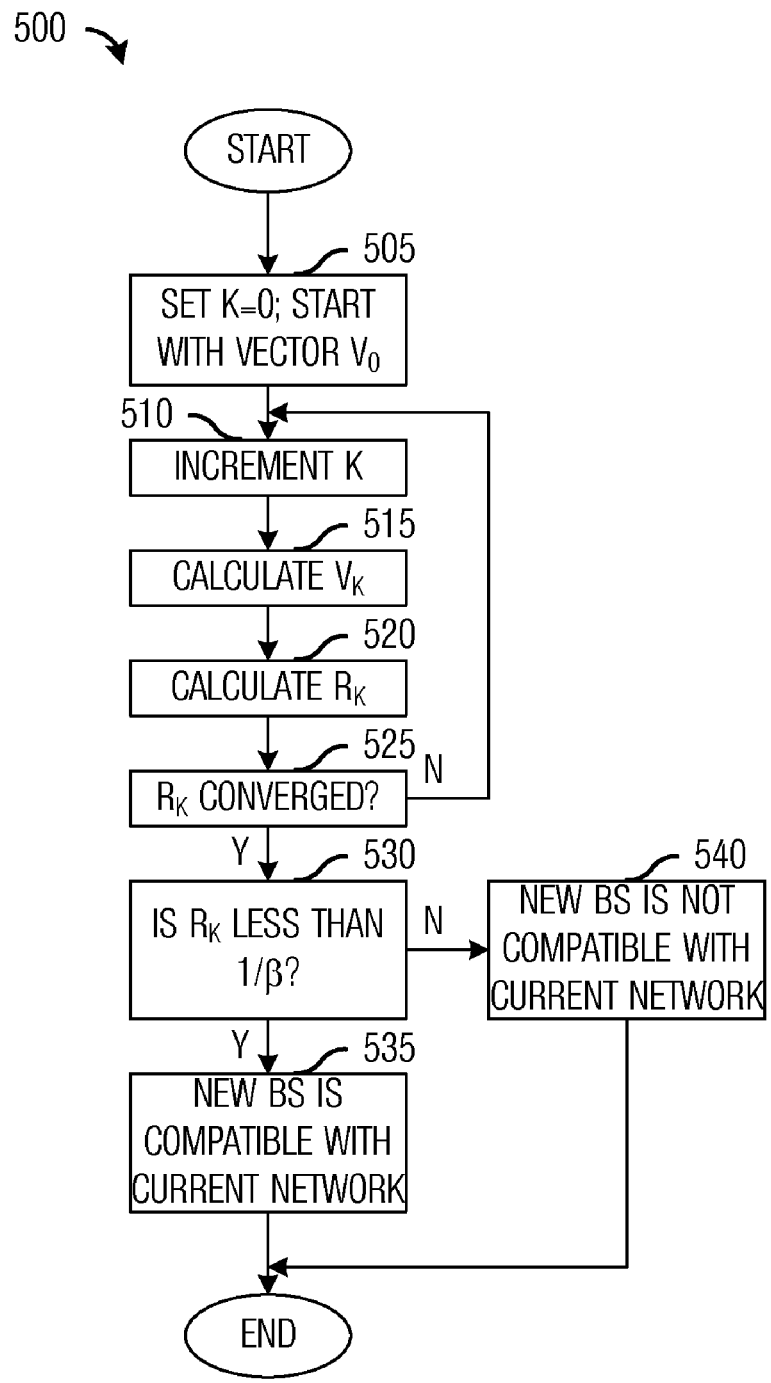
FIG. 5 is a flow diagram of second BS operations in determining compatibility between a BS, such as a femto BS, and a communications network.

FIG. 5 illustrates a flow diagram of second BS operations 500 in determining compatibility between a BS, such as a femto BS, and a communications network. Second BS operations 500 may be indicative of operations occurring in the BS as it determines compatibility with the communications network. Second BS operations 500 may occur as the BS attempts to join the communications network. Second BS operations 500 may be an implementation of determining its compatibility with the communications network, block 305 of FIG. 3.

Second BS operations 500 may exploit a fast calculation of the largest eigenvalue of a non-negative symmetric matrix as offered by a power method. Second BS operations 500 may begin initializing variables (block 505). For example, an indexing variable k may be set to zero and a vector of transmit power levels v may be initialized to starting levels. The indexing variable may then be incremented (block 510).

The BS may then compute a vector of transmit power levels for index k, $v_k$ (block 515). The computation of $v_k$ may be expressed as:

$$v_k = \frac{Hv_{k-1}}{\|v_{k-1}\|},$$

where H is channel attenuation matrix.

With $v_k$ computed, the BS may compute a vector of the largest eigenvalues for index k, $r_k$ (block 520). The computation of $r_k$ may be expressed as:

$$r_k = \frac{v_k^T H v_k}{v_k^T v_k},$$

where $v_k^T$ is the transpose of $v_k$.

The BS may then check to determine if $r_k$ has converged (block 525). In general, $r_k$ may be considered to have converged if consecutive values of r change by less than a threshold. For example, if two (or some other number greater than or equal to two) consecutive values of r have changed by less than a threshold, then r may be considered to have converged. If r has not converged, then k may be incremented and the BS may repeat its computation of $v_k$ and $r_k$ by returning to block 510.

When r is considered to have converged, the BS may perform a check to determine the compatibility of the communications network and the BS by checking to see if $r_k$ is less than 1/β (block 530). If $r_k$ is less than 1/β then the communications network and the BS are compatible (block 535), while if $r_k$ is not less than 1/β then the communications network and the BS are not compatible (block 540). Second BS operations 500 may then terminate.

The comparison of $r_k$ and 1/β (block 535) may be based on a linear algebraic result of $$\lim_{k \to \infty} r_k = r(H).$$

The convergence of $r_k$ may be slow if the second largest eigenvalue is close in value to the largest eigenvalue. In particular, when the row sums are equal, the convergence of $r_k$ may tend to be slow.

Figure 6:
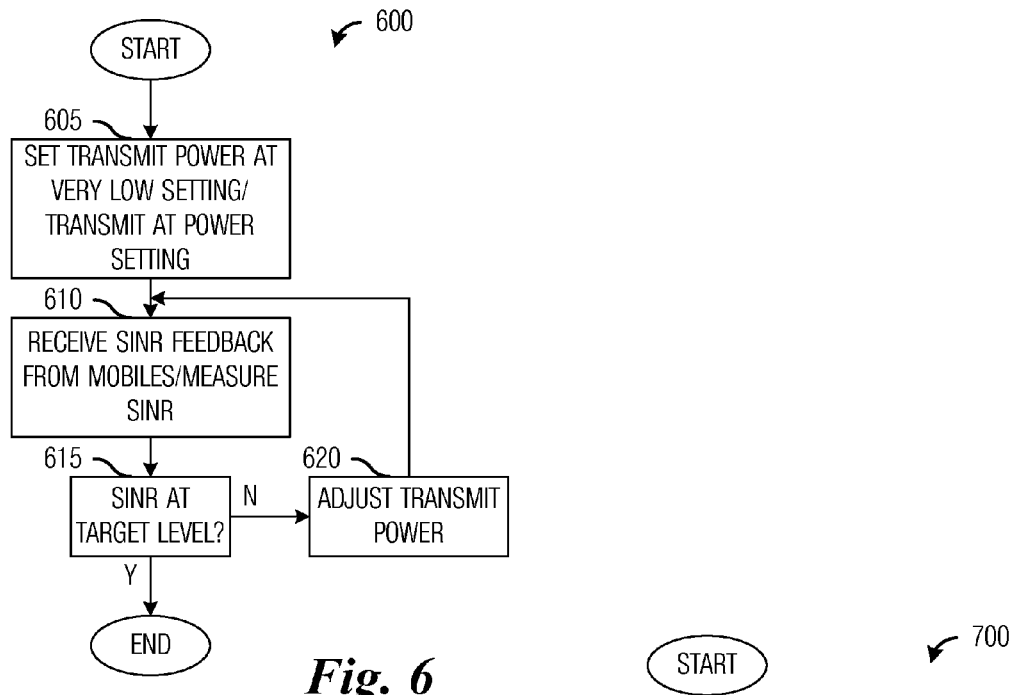
FIG. 6 is a flow diagram of third BS operations in adjusting transmit power level.

FIG. 6 illustrates a flow diagram of third BS operations 600 in adjusting transmit power level. Third BS operations 600 may be indicative of operations occurring in a BS, such as a femto BS, as the BS adjusts its own transmit power level to minimize interference and maximize overall performance.

Third BS operations 600 may begin with the BS setting the transmit power level at a very low setting (block 605). For example, the BS may set the transmit power level to a non-zero level that will ensure that MSs within its coverage area will be able to detect transmissions from the BS, but not so high that it will cause significant interference to other BSs in its neighborhood. The BS may then begin to transmit. As an example, the BS may transmit known signals at specified intervals.

The BS may then begin to receive feedback from MSs operating within its coverage area (block 610). The feedback from the MSs may include SINR measurements made by the MSs. According to an alternative embodiment, since the coverage area of the BS is expected to be small, the BS itself may enter a receive mode and make its own SINR measurements.

The BS may perform a check to determine if the SINR measurements either received as feedback or measured by the BS itself are at target levels (block 615). If the SINR measurements are not at the target levels (plus or minus a threshold), then the BS may adjust the transmit power level (block 620). For example, if the SINR measurements are below the target levels, then the BS may boost its transmit power level, while if the SINR measurements are above the target levels, then the BS may decrease its transmit power level. The BS may return to block 610 to receive additional SINR measurement feedback (or make more SINR measurements). If the SINR measurements are at the target levels, then third BS operations 600 may then terminate.

Figure 7:
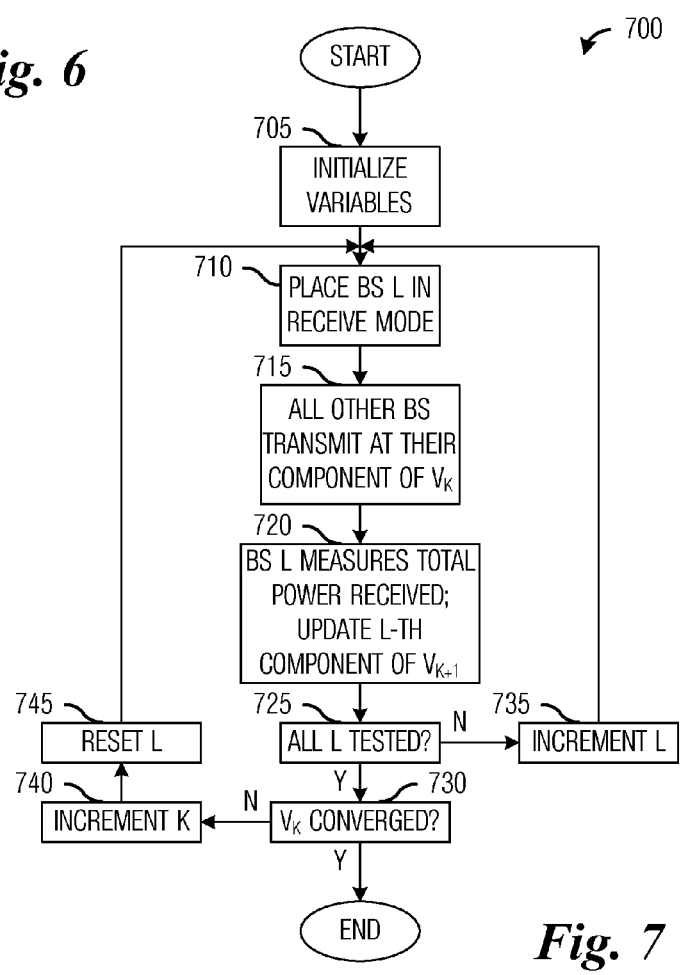
FIG. 7 is a flow diagram of fourth BS operations in adjusting transmit power level.

FIG. 7 illustrates a flow diagram of fourth BS operations 700 in adjusting transmit power level. Fourth BS operations 700 may be indicative of operations occurring in a BS, such as a femto BS, as the BS adjusts its own transmit power level to minimize interference and maximize overall performance.

Fourth BS operations 700 may occur in each of the BSs in a communications network. Coordination between the BSs in the communications network may be required and may be performed by message passing between the BSs or by a centralized controller connected to the BSs.

Fourth BS operations 700 may begin with the BS initializing variables that it may use in adjusting transmit power levels (block 705). Variables that may be used include two index variables: L and K, where L references a BS currently adjusting transmit power level and K is a count of a current iteration of transmit power level adjustment. Additionally, a vector $V_K$ comprising entries related to a transmit power level for each of the L BSs may also be initialized. According to an embodiment, K and L may both be initialized to zero, while vector $V_K$ may be initialized to low transmit power levels.

A BS L may be placed into a receive mode (block 710) while all of the remaining L−1 BSs may be placed into a transmit mode and will transmit at a transmit power level corresponding to their particular entry in vector $V_K$ (block 715). The BS L may then measure a total received power from the transmissions from the L−1 BSs and update the L-th entry of vector $V_{K+1}$ (block 720). For example, if there are a total of 10 BSs in the communications network, L=2, K=3, then BS 2 will be placed in receive mode, and BSs 1, 3, . . . , 10 will be placed in transmit. BS 2 will make a measurement of the total received power and update entry 2 in vector $V_4$.

A check may then be performed to determine if all BSs have updated their corresponding entry in vector $V_{K+1}$ (block 725). If all BSs have updated their corresponding entry in vector $V_{K+1}$, then a check may be performed to determine if vector $V_K$ has converged (block 730). According to an embodiment, vector $V_K$ may be determined to have converged if consecutive values of all entries in vector $V_K$ change by less than a specified threshold. For example, if two (or any number greater than two) consecutive values of all entries in vector $V_K$ change by less than a specified threshold, then vector $V_K$ may be determined to have converged.

If not all BSs have updated their corresponding entry in vector $V_{K+1}$, then L may be incremented (block 735) and the BSs may return to block 710 to have the next BS measure received power.

If vector $V_K$ has converged, then fourth BS operations 700 may then terminate. However, if vector $V_K$ has not converged, then K may be incremented (block 740) and L may be reset (block 745) and the BSs may return to block 710 to compute their transmit power levels for the new value of K.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitting information in a communications network comprising a plurality of communications controllers, the method comprising:
   determining if an ad hoc communications controller is compatible with the communications network, wherein;
   when the ad hoc communications controller is compatible with the communications network,
      joining the ad hoc communications controller with the communications network,
      setting a transmit power level for a subset of communications controllers in the communications network, wherein the subset of communications controllers comprises the ad hoc communications controller, and wherein the setting is performed in a distributed manner, and
      transmitting information to a communications device served by the ad hoc communications controller at the transmit power level set for the ad hoc communications controller; and
   when the ad hoc communications controller is incompatible with the communications network,
      changing a network operating parameter of the communications controller, and
      repeating the determining if the ad hoc communications controller is compatible with the communications network, the when the ad hoc communications controller is compatible, and the when the ad hoc communications controller is incompatible steps.

2. The method of claim 1, wherein setting a transmit power level comprises at each communications controller in the subset of communications controllers:
   setting a transmit power level to an initial transmit power level;
   transmitting at the transmit power level;
   determining if a signal plus interference to noise ratio (SINR) measurement meets a target level; and
   adjusting the transmit power level when the SINR measurement does not meet the target level.

3. The method of claim 2, wherein the SINR measurement is measured by the communications device served by the ad hoc communications controller and fed back to the ad hoc communications controller.

4. The method of claim 2, wherein the SINR measurement is measured by the communications controller.

5. The method of claim 2, wherein adjusting the transmit power level comprises increasing the transmit power level when the SINR measurement is less than the target level.

6. The method of claim 5, wherein adjusting the transmit power level further comprises decreasing the transmit power level when the SINR measurement is greater than the target level.

7. A method for transmitting information, the method comprising:
   setting a transmit power level for a subset of communications controllers in a communications network, wherein the subset of communications controllers comprises ad hoc communications controllers in the communications network, and wherein the setting is performed in a distributed manner, wherein setting the transmit power level comprises at each communications controller in the subset of communications controllers:
      determining if an index variable corresponds to an identifier of the communications controller;
      when the index variable does not correspond to the identifier, transmitting at a transmit power level associated with the communications device;
      when the index variable does correspond to the identifier,
         measuring a received power level from transmissions made by other communications controllers, and
         updating the transmit power level associated with the communications device; and
      repeating the determining, the when the index variable does not correspond, and the when the index variable does correspond steps in response to determining that the transmit power levels associated with each communications controller in the subset of communications controllers has not converged; and
   transmitting information to a communications device served by a communications controller, wherein the information is transmitted at a transmit power level set for the communications controller.

8. The method of claim 7, wherein setting a transmit power level further comprises updating the index variable until all communications controllers in the subset of communications controllers have updated their respective transmit power level.

9. The method of claim 7, wherein the determining that the transmit power levels associated with each communications controller in the subset of communications controllers has not converged comprises determining that at least one transmit power level has changed by more than a specified amount.

10. A method for transmitting information, the method comprising:
    determining if a communications controller is compatible with a communications network, wherein the communications network comprises a plurality of communications controllers;
    when the communications controller is compatible with the communications network,
       joining the communications network, setting a transmit power level for a subset of communications controllers in the communications network, and transmitting information to a communications device served by the communications controller at a transmit power level set for the communications controller; and when the communications controller is incompatible with the communications network, changing a network operating parameter of the communications controller, and repeating the determining if a communications controller is compatible with a communications network, the when the communications controller is compatible, and the when the communications controller is incompatible steps.

11. The method of claim 10, wherein the network operating parameter comprises an operating band, a time slot, a spreading code, or a combination thereof.

12. The method of claim 10, wherein determining if a communications controller is compatible comprises:

computing a channel attenuation summation between the communications controller and each communications controller in the plurality of communications controllers;

determining if a maximum channel attenuation summation is less than a first threshold;

determining that the communications controller is compatible with the communications network when the maximum channel attenuation summation is less than the first threshold; and determining that the communications controller is incompatible with the communications network when the maximum channel attenuation summation is more than the first threshold.

13. The method of claim 12, wherein computing a channel attenuation summation comprises:

setting the plurality of communications controllers to transmit;

setting the communications controller to receive;

computing the channel attenuation summation between the communications controller and each communications controller in the plurality of communications controllers;

setting the plurality of communications controllers to receive;

setting the communications controller to transmit; and computing the channel attenuation summation between each communications controller in the plurality of communications controllers and the communications controller.

14. The method of claim 10, wherein determining if a communications controller is compatible comprises:

computing a vector of transmit power level settings for each communications controller in the plurality of communications controllers;

computing a vector of largest eigenvalues for each communications controller in the plurality of communications controllers;

determining if the vector of largest eigenvalues has converged;

when the vector of largest eigenvalues has converged, determining if the vector of largest eigenvalues is less than a second threshold, determining that the communications controller is compatible with the communications network when the vector of largest eigenvalues is less than the second threshold, and determining that the communications controller is incompatible with the communications network when the vector of largest eigenvalues is more than the second threshold; and when the vector of largest eigenvalues has not converged, repeating the computing a vector of transmit power level settings, the computing a vector of largest eigenvalues, the determining if the vector of largest eigenvalues has converged, the when the vector of largest eigenvalues has converged, and the vector of largest eigenvalues has not converged steps.

15. The method of claim 14, wherein computing a vector of transmit power level settings comprises evaluating $$v_k = \frac{Hv_{k-1}}{\|v_{k-1}\|},$$

where H is a channel attenuation matrix, and $v_k$ is a vector of transmit power level settings at iteration k.

16. The method of claim 14, wherein computing a vector of largest eigenvalues comprises evaluating $$r_k = \frac{v_k^T H v_k}{v_k^T v_k},$$

where $r_k$ is the vector of largest eigenvalues, H is a channel attenuation matrix, $v_k$ is a vector of transmit power level settings at iteration k, and $v_k^T$ is a transpose of $v_k$.

17. The method of claim 10, wherein setting a transmit power level comprises at each communications controller in the subset of communications controllers, setting the transmit power level to an initial transmit power level;

transmitting at the transmit power level;

determining if a signal plus interference to noise ratio (SINR) measurement meets a target level; and adjusting the transmit power level when the SINR measurement does not meet the target level.

18. The method of claim 10, wherein setting a transmit power level comprises at each communications controller in the subset of communications controllers:

determining if an index variable corresponds to an identifier of the communications controller;

when the index variable does not correspond to the identifier, transmitting at the transmit power level associated with the communications device;

when the index variable does correspond to the identifier, measuring a received power level from transmissions made by other communications controllers, and updating the transmit power level associated with the communications device; and repeating the determining, the when the index variable does not correspond, and the when the index variable does correspond steps in response to determining that the transmit power levels associated with each communications controller in the subset of communications controllers has not converged.

19. A communications controller comprising:
- a switch mode unit configured to switch an operating mode of the communications controller based on a coordination with other communications controllers;
- a received power measure unit coupled to the switch mode unit, the received power measure unit configured to measure a signal power level received at the communications controller when the communications controller is operating in a receive mode;
- a compatibility check unit coupled to the received power measure unit, the compatibility check unit configured to determine compatibility of the communications controller and a communications network based on signal power level measurements; and
- a power control unit coupled to the compatibility check unit, the power control unit configured to set a transmit power level for the communications controller based on the signal power level measurements.

20. The communications controller of claim 19, wherein the compatibility check unit determines the compatibility of the communications controller based on the signal power level measurements made by the received power measurement unit.

21. The communications controller of claim 19, wherein the power control unit sets the transmit power level of the communications controller based on the signal power level measurements made by communications devices served by the communications controller.

22. The communications controller of claim 19, wherein the power control unit sets the transmit power level of the communications controller based on the signal power level measurements made by the received power measure unit.

23. The communications controller of claim 19, wherein the received power measure unit measures the signal power level based on a measurement of a control channel transmission.

* * * * *